United States Patent [19]

Murase

[11] 3,950,615
[45] Apr. 13, 1976

[54] CHRONIC INTERLINE PHASE ERROR FROM AN IMAGE SCANNER GENERATING PLURAL SUCCESSIVE IMAGE SIGNALS IN A SINGLE SCANNING MOTION IS ELECTRONICALLY CORRECTED

[75] Inventor: Katsuo Murase, Hino, Japan

[73] Assignee: Ricoh Co., Ltd., Tokyo, Japan

[22] Filed: Nov. 18, 1974

[21] Appl. No.: 524,824

Related U.S. Application Data

[63] Continuation of Ser. No. 352,557, April 19, 1973, abandoned.

[30] Foreign Application Priority Data

Apr. 28, 1972 Japan.................................. 47-42732

[52] U.S. Cl............................................ 178/69.5 F
[51] Int. Cl.² ........................................... H04N 1/02
[58] Field of Search ................... 178/69.5 F, 6.6 TC

[56] References Cited
UNITED STATES PATENTS
2,945,414   7/1960   Blackstone........................... 178/7.6
3,665,100   5/1972   Pinkham ........................... 178/6.6 R Primary Examiner—George H. Libman
Assistant Examiner—George G. Stellar
Attorney, Agent, or Firm—Cooper, Dunham, Clark, Griffin & Moran

[57] ABSTRACT

A cylindrical scanner scans two lines of a document for each revolution, and has two marks spaced approximately 180° from each other which generate a synchronizing signal for each scanline. In order to allow for production inaccuracies in the relative placement of the two marks, means are provided for shifting the scanning signals for each alternate scanline by an amount which corresponds to the error in the relative positions of the two synchronizing signal marks. Thus, the resulting scanlines are in proper phase relationship with each other.

3 Claims, 4 Drawing Figures

3,950,615

CHRONIC INTERLINE PHASE ERROR FROM AN IMAGE SCANNER GENERATING PLURAL SUCCESSIVE IMAGE SIGNALS IN A SINGLE SCANNING MOTION IS ELECTRONICALLY CORRECTED

This is a continuation of application Ser. No. 352,557 filed Apr. 19, 1973, now abandoned.

BACKGROUND OF THE INVENTION

This invention relates to a synchronizing system which can have application in facsimile transmission apparatus or magnetic recording and reproducing apparatus to obtain synchronization of the image signals with synchronizing signals.

Devices have already been known for use with, say, facsimile transmission apparatus in which a plurality of read-out heads arranged peripherally of a rotary drum and disposed equidistantly from one another are used for successively scanning an objective or a document to produce image signals. In such devices, the image signals corresponding to a plurality of lines scanned by the read-out heads are produced while the rotary drum makes one revolution, and at the same time a plurality of marks provided on the rotary drum to correspond to the plurality of read-out heads produce synchronizing sygnals which are read by the read-out heads, whereby a synchronizing signal can be produced which corresponds to either the starting portion or the terminating portion of the image signal produced by scanning one line.

In such devices, the phase of the starting portion or the terminating portion of the image signal produced by scanning one line and the phase of the synchronizing signal produced are determined by the relative positions of the plurality of synchronizing signals and the plurality of head-out heads on the rotary drum. If ordinary machining is tolerated in production, it will be impossible to obtain accurate relative positions for the heads and the synchronizing signals, with the result that the image signals will be out of phase with the synchronizing signals. Thus the images received by facsimile receiving apparatus are blurred.

SUMMARY OF THE INVENTION

This invention provides a synchronizing system which permits the phase difference between image signals and synchronizing signals to be electrically corrected.

In particular, each of a sequence of successive scanlines of an objective, such as a document, is scanned to derive a corresponding image signal. The sequence of image signals form a composite image signal. A sequence of synchronizing signals are generated, with each synchronizing signal representing the relative position of the scanning means and a selected portion of a scanline. A selected phase difference is defined for at least a selected portion of a selected image signal, and the selected portions are shifted with respect to the remainder of the composite image signal by the defined selected phase difference.

In a specific embodiment of the invention, a cylindrical scanning means provides two scanlines for each revolution and has two synchronizing marks which rotate with the scanning means and each generates a synchronizing signal as it passes by a stationary detector. A phase difference is defined depending on the production error in the relative placement of the two marks, and each alternate scanline is phase shifted with respect to the composite image signal by an amount corresponding to the defined phase difference.

DESCRIPTION OF A PREFERRED EMBODIMENT

Figure 1:
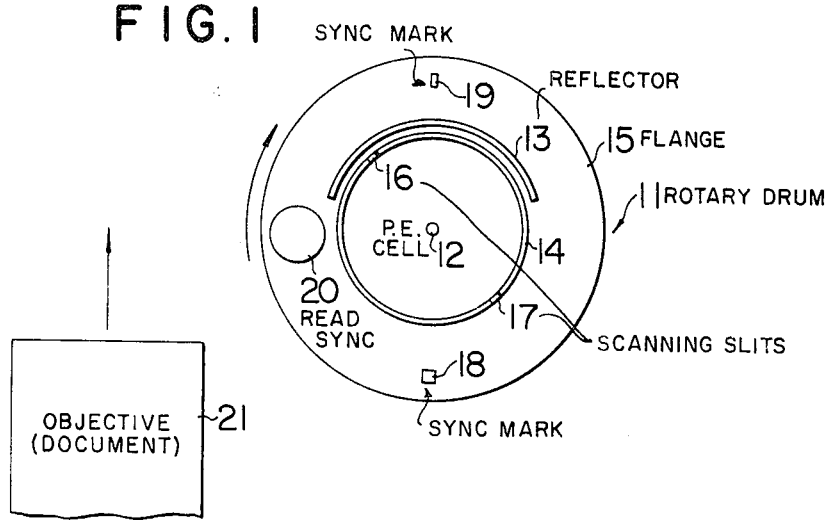
FIG. 1 is a view in explanation of a facsimile transmitting apparatus in which this invention is incorporated.

In FIG. 1, there is shown a facsimile transmission apparatus wherein a photoelectric transducer element 12 is disposed in the center of a rotary drum 11, and a reflector 13 is mounted above a cylindrical portion 14 of a rotary drum 11 and juxtaposed to the photoelectric transducer element 12 with the cylindrical portion 14 of the drum 11 being interposed therebetween.

The rotary drum 11 comprises a flange 15 in addition to the cylindrical portion 14 which intercepts light. The cylindrical portion 14 of the rotary drum 11 is formed therein with two slits 16 and 17, for example, which are disposed in diametrically opposed positions on the cylindrical portion 14 with their major axis being disposed axially of the drum.

Marks 18 and 19 which produce synchronizing signals are provided on the flange 15 of the rotary drum 11 and disposed in positions which are symmetrical with respect to the center of the rotary drum 11. Synchronizing signal read-out means 20 for reading the marks 18 and 19 are provided on the path of movement of the marks 18 and 19 and disposed in a position such that it can start reading of the marks 18 and 19 as soon as the slits 16 and 17 finish with scanning of optical images reflected by the reflector 13 and incident on the photoelectric transducer element 12.

The reflector 13 is constructed such that it has an arcuate reflecting surface extending for an extent of less than 120° along the cylindrical portion 14 about the center of the rotary drum 11 in whose center the photoelectric transducer element 12 is disposed. An objective 21 which may be a document to be transmitted is fed from a predetermined position in the direction of an arrow shown in FIG. 1 at a constant speed so that it may be scanned by the slits 16, 17. An optical image of a portion of the objective 21 which is disposed on a line disposed at right angles to the scanning direction is formed horizontally on the reflector 13. The rotary drum 11 rotates at a constant speed, and scanning is effected by the slits 16 and 17 alternately scanning the optical images formed on the reflector 13. The optical images are then converted into electric signals by the phototransducer element 12 and taken out as image signals of the objective. The slits 16 and 17 are each adapted to scan one line while the rotary drum 11 makes one revolution.

The facsimile transmission apparatus as aforementioned is known from U.S. Pat. No. 3,345,460 and U.S. Pat. No. 3,562,426. The synchronizing signal read-out means 20 reads the marks on the rotary drum 11 and produces a synchronizing signal which is synchronous with the terminating portion of the image signal produced by scanning each one line.

Synchronizing of the image signals and the synchronizing signals produced in this way will be explained with reference to wave forms. The synchronizing signal read-out means 20 produces synchronizing signals A and B shown in FIG. 2 (a) which are obtained alternately from the marks 18 and 19. The synchronizing signals A and B, which have signal durations $\tau^1$ and $\tau^2$ respectively which are in accord with the size of marks 18 and 19 and the peripheral velocity of the rotary drum 11, are alternately obtained at an interval t1 which corresponds to the time during which the rotary drum 11 makes one-half revolution.

Figure 2:
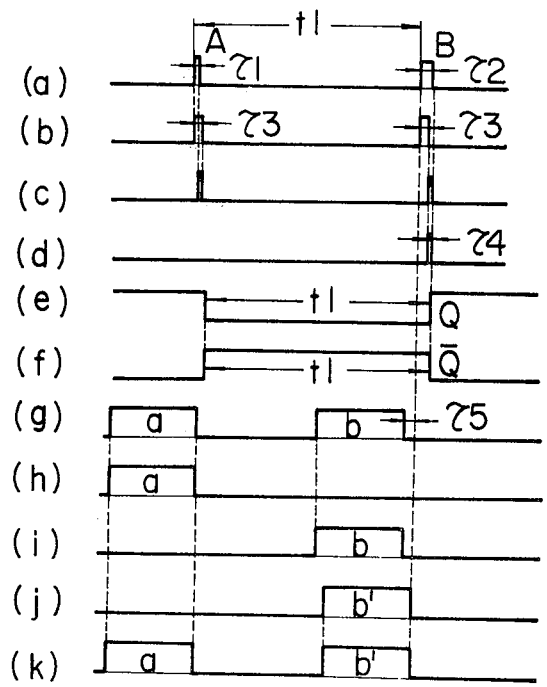
FIG. 2 (a) to FIG. 2 (k) and FIG. 3 (a) to FIG. 3 (d) show wave forms in explanation of one embodiment of the synchronizing system according to the invention.

Pulse signals having a pulse duration $\tau^3$ and rising in synchronism with the synchronizing signals A and B are produced as shown in FIG. 2 (b). The marks 18 and 19 differ in size such that $\tau^1 < \tau^3 < \tau^2$. Then a pulse is produced which, as shown in FIG. 2 (c), occures between the decaying of the synchronizing signals shown in FIG. 2 (a) and the decaying of the pulses shown in FIG. 2 (b). A pulse as shown in FIG. 2 (d) is produced from the pulses shown in FIG. 2 (c) and the synchronizing signals shown in FIG. 2 (a) by an AND operation. This pulse has a pulse duration $\tau^4$ which is $\tau^4 = \tau^2 - \tau^3$.

Then a pulse signal $\overline{Q}$ having a duration t1 as shown in FIG. 2 (e) and a pulse signal Q which is opposite in phase to the pulse signal Q as shown in FIG. 2 (f) are produced from the pulse shown in FIG. 2 (d).

Let us assume that an image signal b of image signals a and b (FIG. 2 (g)) obtained by the photoelectric transducer element 12 is advanced in phase by $\tau^5$ as compared with synchronizing signal B. The image signals a and b are the result of scanning of one line. An image signal a as shown in FIG. 2 (h) is produced from the image signals a and b shown in FIG. 2 (g) and the signal pulse Q shown in FIG. 2 (e) by an AND operation, and an image signal b as shown in FIG. 2 (i) is produced from the image signals a and b shown in FIG. 2 (g) and the pulse signal $\overline{Q}$ shown in FIG. 2 (f) by an AND operation.

The image signals a and b obtained by scanning the objective by the slits 16 and 17 are divided in this way, and the image signal b which is advanced in phase as compared with the corresponding synchronizing signal is delayed by $\tau^5$ which corresponds to the advancement in phase so as to produce a signal b as shown in FIG. 2 (j). Then image signals as shown in FIG. 2 (k) are produced from the image signal b' shown in FIG. 2 (j) and the image signal a shown in FIG. 2 (h) by an OR operation. This image signal is synchronous with the synchronizing signals shown in FIG. 2 (a).

The times $\tau^5$, $\tau^3$ of synchronizing signals and image signals can be set from the visible images of these signals by an oscilloscope. Alternatively, a microscope may be used for measuring the relative positions of the slits 16 and 17 and the marks 18 and 19 to effect the setting.

Figure 3:
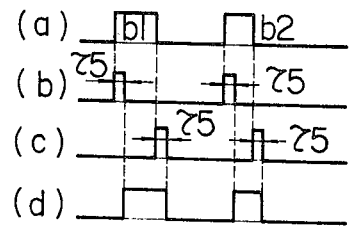

The image signal b may be delayed by using a delay line, dynamic shift resister or a monostable multivibrator. One example of the process for delaying the image signal b will be described. As shown in FIG. 3 (a), the image signal b comprises pulses b1 and b2. A pulse having a pulse duration $\tau^5$ and rising in synchronism with the rising of pulses b1 and b2 as shown in FIG. 3 (b) is produced, and a pulse having a pulse duration $\tau^5$ and rising in synchronism with the decaying of pulses b1 and b2 as shown in FIG. 3 (c) is produced. If a pulse is produced which is produced between the decaying of the pulse shown in FIG. 3 (b) and the decaying of the pulse shown in FIG. 3 (c), such pulse will be delayed by $\tau^5$ as compared with pulses b1 and b2.

Figure 4:
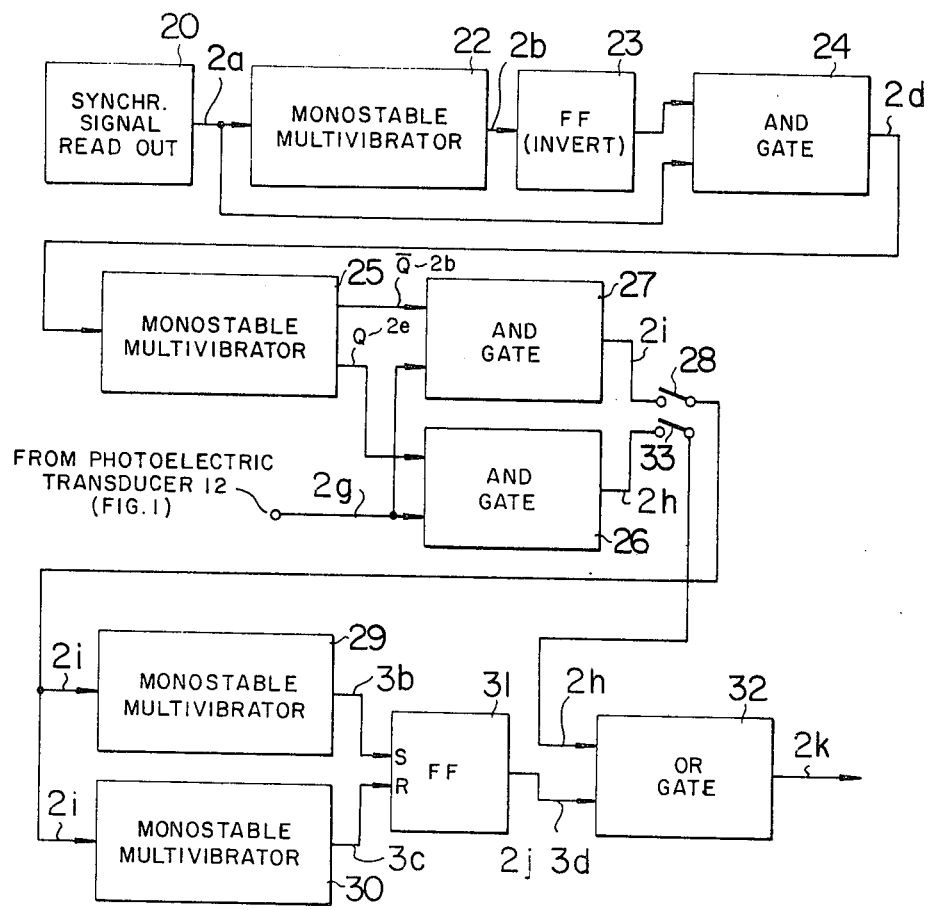
FIG. 4 is a block diagram of one embodiment of the synchronizing system according to the invention.

The invention will now be described with reference to an embodiment shown in FIG. 4. The synchronizing signals shown in FIG. 2 (a) obtained by the synchronizing signal read-out means 20 are supplied to a monostable multivibrator 22 and shaped into the signals shown in FIG. 2 (b) which are supplied to a flip-flop 23 which repeatedly performs an inversion operation.

The outputs of flip-flop 23 and synchronizing signal read-out means 20 are supplied to a gate circuit 24 where an AND operation is performed to produce the signal shown in FIG. 2 (d). The output of gate circuit 24 is supplied to a monostable multivibrator 25 to produce the pulse signals Q and $\overline{Q}$ shown in FIG. 2 (e) and FIG. 2 (f) respectively. The pulse signal Q is supplied, together with the image signals obtained by the photoelectric transducer element 12 as shown in FIG. 2 (g), to a gate circuit 26 where an AND operation is performed to produce the image signal a shown in FIG. 2 (h), while the pulse signal $\overline{Q}$ is supplied, together with the image signals obtained by the photoelectric transducer element 12 as shown in FIG. 2 (g), to a gate circuit 27 where an AND operation is performed to produce the image signal b as shown in FIG. 2 (i).

The image signal b is supplied through a switch 28 to monostable multivibrators 29 and 30 to produce the signals shown in FIG. 3 (b) and FIG. 3 (c). These signals are supplied as a set signal and a reset signal to a flip-flop 31 to produce the signals shown in FIG. 2 (j) and FIG. 3 (d). These signals are supplied to a gate circuit 32 where an OR operation is performed to produce the signals shown in FIG. 2 (k).

When the slits and marks shown in FIG. 1 are each more than three in number, the image signals obtained by scanning more than three lines by the slits are divided and then mixed after a phase difference from the corresponding synchronizing signal or signals is corrected by phase shift. It is to be understood that the invention also can have application in magnetic recording and reproducing apparatus for synchronizing image signals which are reproduced with synchronizing signals which are produced in synchronism with the image signals.

What is claimed is:

1. A system comprising:
   means for scanning each of a sequence of successive scanlines of an objective to derive a corresponding sequence of image signals, a plurality of scanlines being scanned in a single scanning motion of the scanning means to derive a corresponding composite signal comprising a plurality of image signals;
   means for generating, for each scanning motion of the scanning means, a plurality of synchronizing signals, one for each image signal, said generating means including means stationary with respect to the scanning means, and each synchronizing signal occurring at a defined position of the scanning means with respect to said stationary means;
   means for defining a selected fixed phase difference for at least a selected portion of one of the image signals with respect to the synchronizing signal for the last recited image signal; and
   means for shifting the selected portion of the image signal by the defined phase difference with respect to the remainder of the composite signal, wherein each composite signal comprises a first and a second image signal corresponding respectively to a first and a second adjacent scanline scanned in a single scanning motion of the scanning means; and the means for defining a selected phase difference comprises means for defining a selected phase difference for only the first image signal of each composite signal, said phase difference being with respect to the synchronizing signal for said first image signal of each composite signal, whereby the image signal corresponding to the first scanline of each two adjacent scanlines is shifted with respect to the second image signal corresponding to the second scanline, while the second image signal is not shifted.

2. A system as in claim 1 wherein:

the means for defining a selected phase difference comprises a first monostable multivibrator providing a first timing interval signal in response to every other synchronizing signal, said timing interval signal being of shorter duration than the duration of two adjacent image signals, and gate means interposed between the scanning means and the shifting means and responsive to the timing interval signal from the first multivibrator for applying to the shifting means only the portions of the composite signal coinciding in time with said timing interval signal.

3. A system as in claim 2 wherein the shifting means comprises a bistable circuit having a first and a second output signal, a second monostable multivibrator interposed between the gate means and the bistable circuit and responsive to a first type image signal to provide a second time interval signal and to cause the bistable circuit to provide its first output signal and a third monostable multivibrator providing a third time interval signal in response to a second type image signal to cause the bistable circuit to provide its second output signal, one of the output signals of the bistable circuit representing the shifted portion of the composite signal.

* * * * *